(12) United States Patent
Wei

(10) Patent No.: US 8,089,782 B2
(45) Date of Patent: Jan. 3, 2012

(54) HIGH ACCURACY AVERAGE OUTPUT CURRENT CONTROL SCHEME FOR POWER CURRENT CONVERTER IN CRITICAL DCM

(75) Inventor: Qi Cui Wei, Hangzhou (CN)

(73) Assignee: Da Peng Weng, Sunnyvale, CA (US)

( * ) Notice: Subject to any disclaimer, the term of this patent is extended or adjusted under 35 U.S.C. 154(b) by 456 days.

(21) Appl. No.: 12/316,910

(22) Filed: Dec. 18, 2008

(65) Prior Publication Data

US 2009/0189587 A1 Jul. 30, 2009

(30) Foreign Application Priority Data

Jan. 25, 2008 (CN) .......................... 2008 1 0059346

(51) Int. Cl.
*H02M 3/335* (2006.01)
*G05F 1/40* (2006.01)

(52) U.S. Cl. ..................................... 363/21.13; 323/283

(58) Field of Classification Search .......... 323/235–244, 323/282–285, 290, 299; 363/20, 21.01, 21.12, 363/21.13

See application file for complete search history.

(56) References Cited

U.S. PATENT DOCUMENTS

| | | | |
|---|---|---|---|
| 6,946,819 B2 * | 9/2005 | Fagnani et al. | 323/207 |
| 7,279,876 B2 * | 10/2007 | Adragna et al. | 323/284 |
| 7,295,452 B1 * | 11/2007 | Liu | 363/82 |
| 7,746,926 B2 * | 6/2010 | Chu et al. | 375/238 |
| 7,751,471 B2 * | 7/2010 | Chu et al. | 375/238 |

* cited by examiner

*Primary Examiner* — Adolf Berhane

(57) ABSTRACT

High accuracy average output current control scheme for power current converter in critical DCM is composed of the reference block to generate preset reference; the reference calculation block, based on the power current converter's power topology, the correspondent algorithm is calculated to convert the input reference into correspondent output; the state detecting block, the states of power current converter are detected and the detected signals are converted into the same signal format as one of output from reference calculation block; the error detector is used to detect the error between the outputs from reference calculation block and state detected block and to trigger power driver block to turn off the power switch in the power current converter as the error is cross over zero; the zero state detector is used to detect when the states of the power current converter are cross over zero and trigger power driver block to turn on the power switch in the power current converter; the power driver block is controlled with both the error detector and the zero state detector to drive the power switch in the power current converter; based on the correspondent algorithm, the output of power driver block may be used for synchronizing calculation.

With the invented control scheme, it makes the accuracy of average output current of the power current converter independent of input and output voltages, circuit devices accuracy of the power current converter, and makes the average output current in high accuracy control, control scheme implement in simple and low cost.

8 Claims, 3 Drawing Sheets

1-reference calculation block, 2-error detector (comparator), 3-state zero detector, 4-power driver

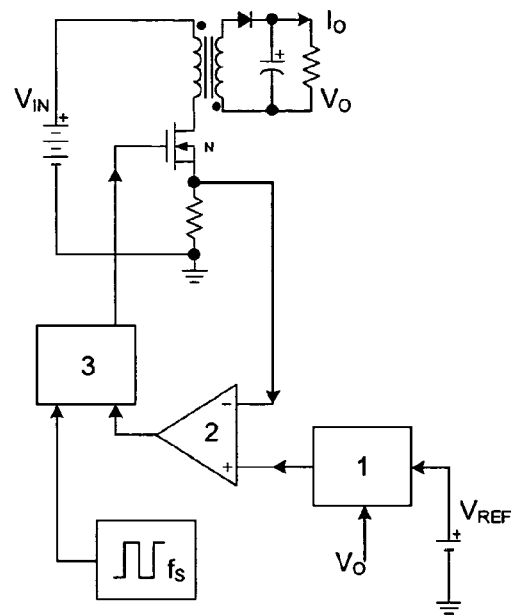
Fig.1    Prior Art
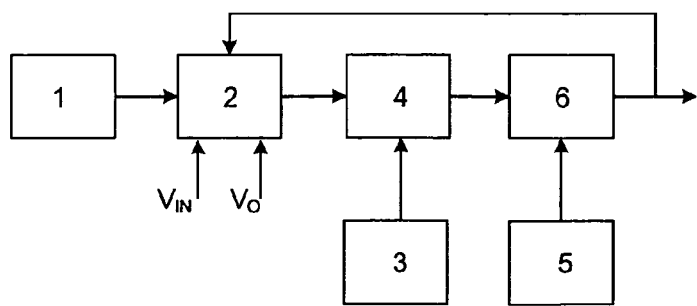
Fig.2 1-reference block, 2-reference calculation block, 3-state detecting block, 4-error detecting block, 5-zero detect block, 6-power driver block.

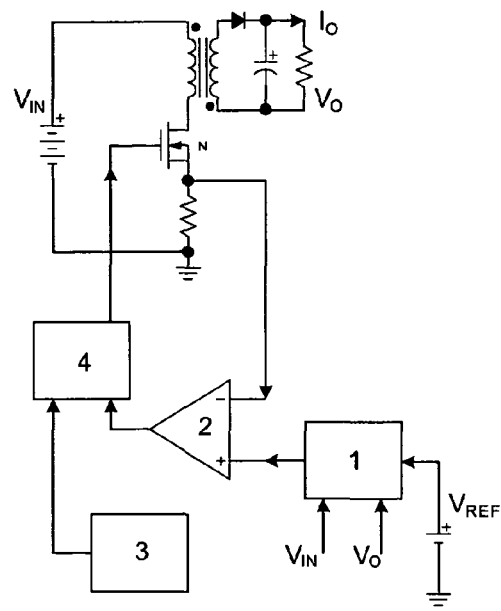
Fig. 3  1-reference calculation block, 2-error detector (comparator), 3-state zero detector, 4-power driver
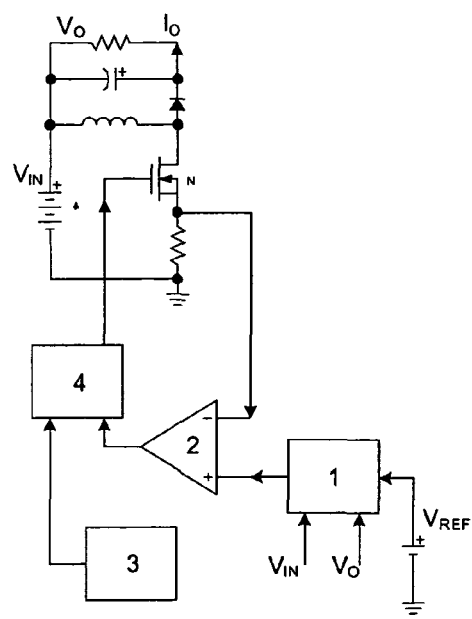
Fig.4  1-reference calculation block, 2- error detector (comparator), 3-state zero detector 4-power driver

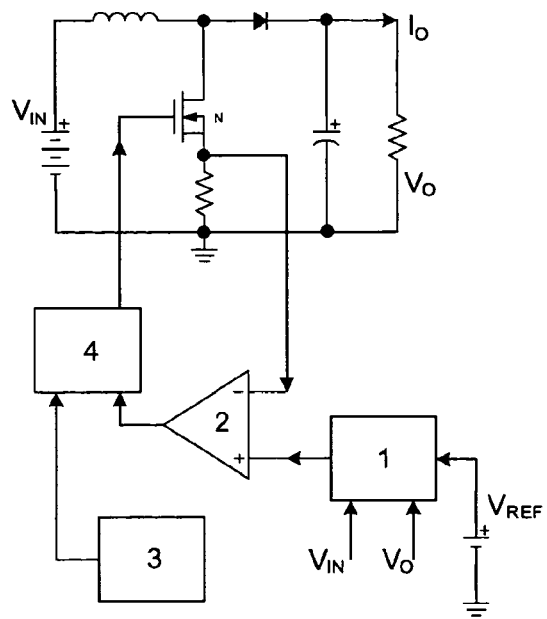
Fig.5  1-reference calculation block, 2- error detector (comparator), 3-state zero detector, 4-power driver
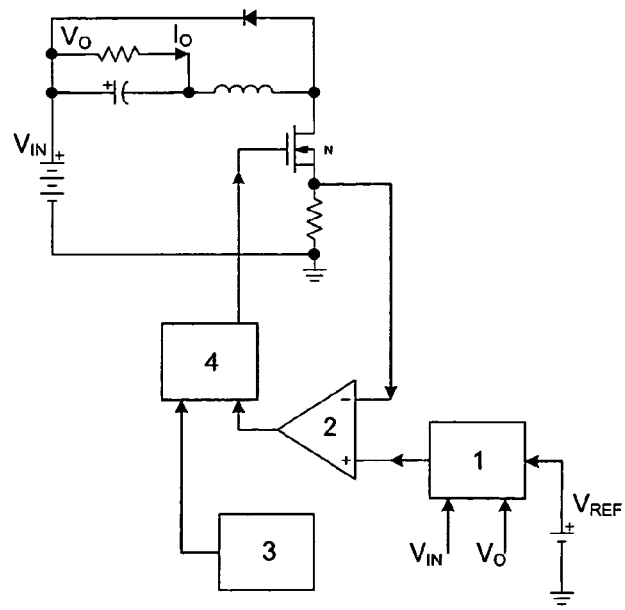
Fig.6  1-reference calculation block, 2- error detector (comparator), 3-state zero detector, 4-power driver

HIGH ACCURACY AVERAGE OUTPUT CURRENT CONTROL SCHEME FOR POWER CURRENT CONVERTER IN CRITICAL DCM

BACKGROUND OF THE INVENTION

The present invention relates to power current converter topology and control. More particularly, the invention relates to a new high accuracy control scheme to control the output current of the power current converter, and the power current converter can be used as a controllable current source for several applications, e.g. LED driver and Battery charger.

In existed power current converter control schemes, as power current converter's inductor current running in discontinuous mode (DCM), there is constant power control scheme, that is, as the peak current of the inductor can be controlled, the output power can be controlled.

$$P_{OUT} = \frac{1}{2} \cdot f_S \cdot L \cdot I_{peak}^2$$

It uses to generate a series of PWM pulses and to control the power switch in the power current converter. It can make the output average current following the preset reference signal. The control scheme makes that the average output accuracy is largely dependent on the input and output voltages of the power current converter, accuracy of circuit devices and switching frequency. In lower accuracy output application, the control scheme has been widely used. To increase control accuracy is a key point to extend the control scheme application area.

SUMMARY OF THE INVENTION

The present invention discloses a novel "High Accuracy Average Output Current Control Scheme for Power Current Converter in Critical DCM" scheme to control a power current converter and make the average output current accuracy independent of the input and output voltages of the switching converter and accuracy of circuit devices and the switching frequency.

The control scheme is composed of several blocks. The reference block generates preset reference; The reference calculation block, based on the power current converter's power topology, the correspondent algorithm is calculated to convert the input reference into correspondent output; The state detecting block, the states of power current converter are detected and the detected signals are converted into the same signal format as one of output from reference calculation block; The error detector is used to detect the error between the outputs from reference calculation block and state detected block and to trigger power driver block to turn off the power switch in the power current converter as the error is cross over zero; The zero state detector is used to detect when the states of the power current converter is cross over zero and trigger power driver block to turn on the power switch in the power current converter; The power driver block is controlled with both the error detector and the zero state detector to drive the power switch in the power current converter; based on the correspondent algorithm, the output of power driver block may be used for synchronizing calculation.

The reference block can be simple as comprising of a basic operation and be implemented with several operation functions. The reference calculation block is based on the power current converter's power topology the correspondent algorithm is calculated to convert the input reference signal from the reference block into correspondent power current converter's reference control signal. It can be simple as a basic operation and be implemented with several operation functions. In the reference calculation block, based on the implemented correspondent algorithm scheme, the input and output voltages of the power current converter can involve or partial involve or even not involve the correspondent algorithm calculation to generate correspondent reference control signal. The error detector block can be simple as comprising of a basic operation and be implemented with several operation functions. The state detect block can be simple as a sense resistor and be implemented with several operation functions. The zero detect block can be simple as comprising of a basic operation and be implemented with several operation functions. The power driver block can be simple as comprising of a basic operation and be implemented with several operation functions.

The invented control scheme is composed of several function blocks. As shown in FIG. 2, they are reference block, reference calculation block, state detecting block, error detecting block, zero detect block and the power driver block.

Based on the power current converter's power topology the correspondent algorithm is calculated to convert the preset reference signal from the reference block into correspondent power current converter's reference control signal. In order to compare the reference control signal and the state variables of the power current converter during the power switch turn-on, the output $V_{iL}$ from state detecting block and the output $V_{REF}$ from the reference calculation block are detected in the error detector block. As the output from error detector is cross over zero, the output of the error detecting block controls the power driver to turn off the power switch of the power current converter. The zero detecting block keeps to detect state variables of the power current converter. As the state variables is cross over zero, the zero detecting block output controls the power driver to turn on the power switch of the power current converter and repeat switching cycle.

The invented control scheme, the inductor current is a high frequency triangle waveform. Due to critical discontinuous, the valley of the inductor current is zero and the average current of the inductor current is half of the peak current. The peak current is following with the reference control signal correspondent with the preset reference signal and it makes the average output current of the power current converter is following with the preset reference signal. The control scheme is simpler and doesn't need an additional compensation circuit. The invented control scheme can make the accuracy of average output current of the power current converter independent of input and output voltages, circuit devices accuracy of the power current converter. The power current converter's input and output voltages and circuit devices accuracy are only impacted on the switching frequency of the power current converter.

BRIEF DESCRIPTION OF THE DRAWINGS

FIG. 1 is an existed constant power control scheme for flyback converter's average output current control;

FIG. 2 is the present invention average output current control scheme block diagram for power current converter;

FIG. 3 is one of detailed embodiment of the "High Accuracy Average Output Current Control Scheme for Power Current Converter in Critical DCM" scheme block diagram for a flyback converter.

FIG. 4 is one of detailed embodiment of the "High Accuracy Average Output Current Control Scheme for Power Current Converter in Critical DCM" scheme block diagram for a buck-boost converter.

FIG. 5 is one of detailed embodiment of the "High Accuracy Average Output Current Control Scheme for Power Current Converter in Critical DCM" scheme block diagram for a boost converter.

FIG. 6 is one of detailed embodiment of the "High Accuracy Average Output Current Control Scheme for Power Current Converter in Critical DCM" scheme block diagram for a buck converter.

DETAIL DESCRIPTION OF THE INVENTION

FIG. 3 shows one detailed embodiment of invention scheme block diagram for flyback power current converter. In the detailed block diagram, there are several blocks: preset reference signal $V_{REF}$, reference calculation block 1, comparator 2, state zero detector 3 and power driver 4 for the power switch.

As power switch turns on, the inductor current increases. The inductor current is detected as a sense voltage on the sense resistor. In the comparator 2, the sensed voltage compares with the reference control signal correspondent with the preset reference signal $V_{REF}$ and from the reference calculation block. As the comparator 2 outputs from "1" to "0", the power driver 4 turns off the power switch. The state zero detector 3 detects the inductor current of the flyback power current converter. As the inductor current decays and is cross over zero, the state zero detector triggers the power driver 4 to turn on the power switch. In this way, the power switch turns on and off in switching cycle.

The reference calculation block of the flyback power current converter shown in FIG. 3 is based on the flyback power current converter topology and input and output voltages of the flyback power current converter can involve or partial involve or even not involve the correspondent algorithm calculation to generate correspondent reference control signal. The peak inductor current of the flyback power current converter is following with the reference control signal output from the reference calculation block and it makes the average output current of the flyback power current converter follow with the preset reference signal $V_{REF}$, and makes the average output current of the flyback power current converter independent of input and output voltages of the flyback power current converter and the accuracy of circuit devices.

FIG. 4 shows one detailed embodiment of invention scheme block diagram for buck-boost power current converter. In the detailed block diagram, there are several blocks: preset reference signal $V_{REF}$, reference calculation block 1, comparator 2, state zero detector 3 and power driver 4 for the power switch. The operation principle is the same as one in FIG. 3.

FIG. 5 shows one detailed embodiment of invention scheme block diagram for boost power current converter. In the detailed block diagram, there are several blocks: preset reference signal $V_{REF}$, reference calculation block 1, comparator 2, state zero detector 3 and power driver 4 for the power switch. The operation principle is the same as one in FIG. 3.

FIG. 6 shows one detailed embodiment of invention scheme block diagram for buck power current converter. In the detailed block diagram, there are several blocks: preset reference signal $V_{REF}$, reference calculation block 1, comparator 2, state zero detector 3 and power driver 4 for the power switch. The operation principle is the same as one in FIG. 3.

As the inductor current of the power current converter is discontinuous, the stress on the power switch is higher. It will increase the conducting loss on power switch. For the discontinuous inductor current, as the inductor current of the power current converter is critical discontinuous, the related stress on the power switch is the lowest and the related conducting loss is the lowest.

As the inductor current of the power current converter is discontinuous, it means the current in the freewheel diode of the power current converter decays to zero and it can avoid the diode reverse recover current and make the switching loss of the power current converter low.

The benefit of using "High Accuracy Average Output Current Control Scheme for Power Current Converter in Critical DCM" is to make the average output current in high accuracy control, control scheme implement in simple and low cost. The power current converter's conducting and switching loss are lower. The whole system is in high accuracy and high efficiency.

What is claimed is:

1. A High accuracy average output current control scheme for power current converter in critical DCM comprising:
    a reference block generating a preset reference signal;
    a reference calculation block based on the power current converter's power topology, the correspondent algorithm is calculated to convert the input reference from the reference block into correspondent reference control signal output;
    a state detecting block is to detect the turn-on inductor current of a switching power current converter and converting the current into the same signal format as the reference control signal from the reference calculation block;
    an error detector is used to detect the error between the outputs from the reference calculation block and the state detected block and to trigger power driver block to turn off the power switch in the power current converter as the error is cross over zero;
    a zero state detector is used to detect when the inductor current of the power current converter is cross over zero and trigger power driver block to turn on the power switch in the power current converter;
    a power driver block is controlled with both the error detector and the zero state detector to drive the power switch in the power current converter;
    Based on the correspondent algorithm, the output of power driver block is used for synchronizing calculation.

2. The High accuracy average output current control scheme for power current converter in critical DCM of claim 1, wherein the error detector can be simple as comprising of a comparator.

3. The High accuracy average output current control scheme for power current converter in critical DCM of claim 1, wherein the state detect block, it can be simple as comprising of a sense resistor.

4. The High accuracy average output current control scheme for power current converter in critical DCM of claim 1, wherein the reference block, it can be simple as a DC voltage signal.

5. The High accuracy average output current control scheme for power current converter in critical DCM of claim 1, wherein the reference calculation block, it can be simple as comprising of a basic operation or be implemented with several operation functions.

6. The High accuracy average output current control scheme for power current converter in critical DCM of claim 1, wherein the reference calculation block, based on the implemented algorithm scheme correspondent with the power converter topology, the input and output voltages of the power current converter don't need to involve the correspondent algorithm calculation to generate correspondent reference control signal.

7. The High accuracy average output current control scheme for power current converter in critical DCM of claim 1, wherein the power driver block, it can be simple as comprising of a basic operation or be implemented with several operation functions.

8. The High accuracy average output current control scheme for power current converter in critical DCM of claim 1, wherein the power driver block, based on the correspondent algorithm in the reference calculation block, the output of power driver block is used for synchronizing calculation.

* * * * *